INVENTOR.
YASUJIRO BAN

United States Patent Office 3,740,286
Patented June 19, 1973

3,740,286
METHOD OF CONTINUOUSLY MANUFACTURING A PLURALITY OF SHEET RECORDS IN A PROCESS
Yasujiro Ban, 42 Tsurumaki-cho, Waseda, Tokyo, Japan
Filed Nov. 5, 1970, Ser. No. 87,141
Claims priority, application Japan, Nov. 17, 1969, 44/91,615
Int. Cl. B31f 1/00
U.S. Cl. 156—219                                          8 Claims

ABSTRACT OF THE DISCLOSURE

A method of continuously manufacturing a plurality of sheet records in a process wherein a long length of transparent or opaque synthetic resin basic sheet material is moved in a direction for being processed in steps, in the first step said basic sheet material is printed on the surfaces, in the second step after having been dried said material is laminated with another long length of sheet material of the same quality as said basic sheet material on its surface or surfaces so as to form a film-like sheet to be seen on the printed surface through said sheet material thereon, in the final step, sound grooves are impressed on the surface or surfaces of the predetermined discs and pressed for being stamped out and punched to form a sheet record coincidentally with the printed marks.

BACKGROUND OF THE INVENTION

The conventional method of manufacturing sheet records wherein a sheet record disc has been usually cut in a desired thickness or size, so as to be formed into required shape before being pressed and labelled one by one, has disadvantages. Particularly, when a record disc is printed on a laminated surface, the manufacturing process has been so complicated that the efficiency of production has been low. Accordingly, the cost has been high and also, has not been able to answer to a big demand of products.

DISCLOSURE OF THE INVENTION

The main object of this invention is to provide a new method of producing sheet records in which, while conveying a long length of transparent or opaque sheet material in a certain direction, or along a path the process is effectively carried on so as to print and laminate the same with a transparent or opaque material. After the process of printing and laminating has been finished, a final process of impressing of sound grooves and pressing for punching is carried out so as to produce continuously a number of beautiful transparent sheet record discs with the printed pictures.

Another object of this invention is to provide a method in which when a printed sheet material is pressed, to form in the final process of pressing and forming, on the edges of said sheet material, such perforation or concavo-convexes or linear projections for inspection of a precise portion to be worked coincidentally with the printed portion.

Still another object of the present invention is to provide a new method in which, at the intermediate process of printing any kind of printing method such as relief or intaglio printing as well as poly or monocolor printing can be adapted so as to produce continuously finished products.

Still another object of the present invention is to provide a new method wherein both printed surfaces of the record disc can be seen from each opposite side therethrough so as to be unnecessary to attach labels thereto.

Yet another object of the present invention is to provide a new method wherein the laminating process is performed by forming into a plurality of sheet materials which are of the same quality as, or evenly formed as the basic sheet material, or by coating the transparent sheet material with opaque coating material or metal leaf.

Other objects, features and advantages of the present invention will become apparent in connection with the following description, the appended claim and the accompanying drawings in which:

Figure 3A:
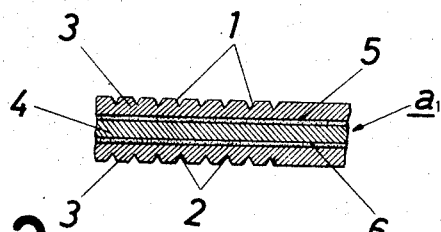
FIGS. 3A, 3B and 3C are enlarged cross sectional views of produced record discs respectively.

With respect to FIG. 3A, a process of a sheet record disc (A) will re explained in detail for an example.

The record disc ($a1$) as illustrated in FIG. 3A consists of transparent, i.e. light-transmissive plastic sheets 3 and 3 fixed on opposite sides of the disc ($a1$) and each having sound grooves 1 and 2 thereon, respectively, and being visible through opposite surfaces between which an opaque plastic sheet 4 having printed marks or visual representations on both sides 5 and 6 thereof is sandwiched.

In order to manufacture a record disc ($a1$), a long length or web of plastic sheet material 4 which is made of opaque synthetic resin, for example, vinyl chloride, polycarbonate or acetate, is from a spool 8 at a feeding station 8 where the plastic sheet is wound in the form of a roll 7, and printed on both sides 5 and 6 of the plastic sheet while being passed through such a printing system 9 as a plurality of printing rolls 10 of the off-set printing process. The printing process produces a plurality of longitudinally spaced visual representations along the web of sheet material 4.

Before the plastic sheet 4 proceeds into the laminating step, the printed surfaces 5 and 6 of the plastic sheet 4 are dried in a drying step 11.

A long length or webs of plastic basic sheet material 4 is laminated by sticking transparent webs of plastic sheet material 3 and 3, wound on spools 12 in the form of rolls 13 on both sides of the basic sheet material after printing thereon at the laminating stations to form a film-like sheet or laminated web ($a1'$) in such a binding operation as heating for melting the materials or pressing by using dry sticking agent or only use of adhesive agent so as not to spoil the printed surfaces 5 and 6 of the basic material 4.

Then, the laminated sheet ($a1'$) is moved to an eliminating step 14 wherein static electricity of the plastic sheets or webs 3 and 3 is eliminated, and finally, the laminated sheet ($a1'$) is conveyed to a finishing step or station 15 wherein the plastic sheets 3 and 3 of the basic material 4 are formed with sound grooves 1 and 1, respectively, on the opposite sides of the laminated sheet ($a1'$) by being impressed, while a center hole 16 and a round shape are stamped out by being punched so as to be worked coincidentally with the print on the basic material 4 by being adjusted with perforations 17 formed on the longitudinal edges of the laminated sheet ($a1'$) which are engaged with sprockets. Further, other holes, such as 17', may be formed on the sheet ($a1'$) for the same object. At one step in the final process more than two sheets or from seven to ten sheets of finished records as shown in FIG. 3A are preferably produced.

Figure 3B:
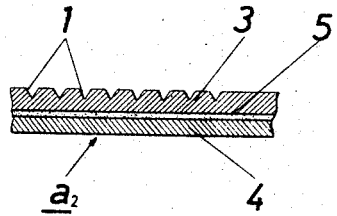

In another embodiment as shown in FIG. 3B, a plastic sheet 3 is laminated on only one side 5 of the printed opaque basic material 4. In the process to produce such a record ($a2$), the printing step is carried out by means of a one side printing system, and also, in the laminating step, the plastic sheet 3 is attached to the printed side of the opaque basic material 4 so as to form a film-like sheet or laminated web (a2′) and in the final step the surface of the plastic sheet 3 is pressed to form a sound groove 1.

Figure 3C:
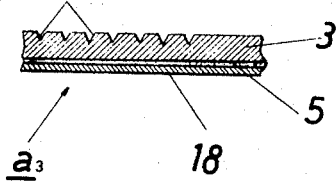

In the other embodiment as shown in FIG. 3C, a plastic sheet 3 is printed on the opposite side of the surface to be grooved so as the marks to be printed negatively. After printed the side is laminated or gilded with such material 18 as paints or metal leaf of aluminum or of other metal, so as to be seen through the sheet 3 positively from the surface thereof. At the final step, the printed plastic sheet 3 is impressed a sound groove 1 and stamped out to form.

Figure 1:
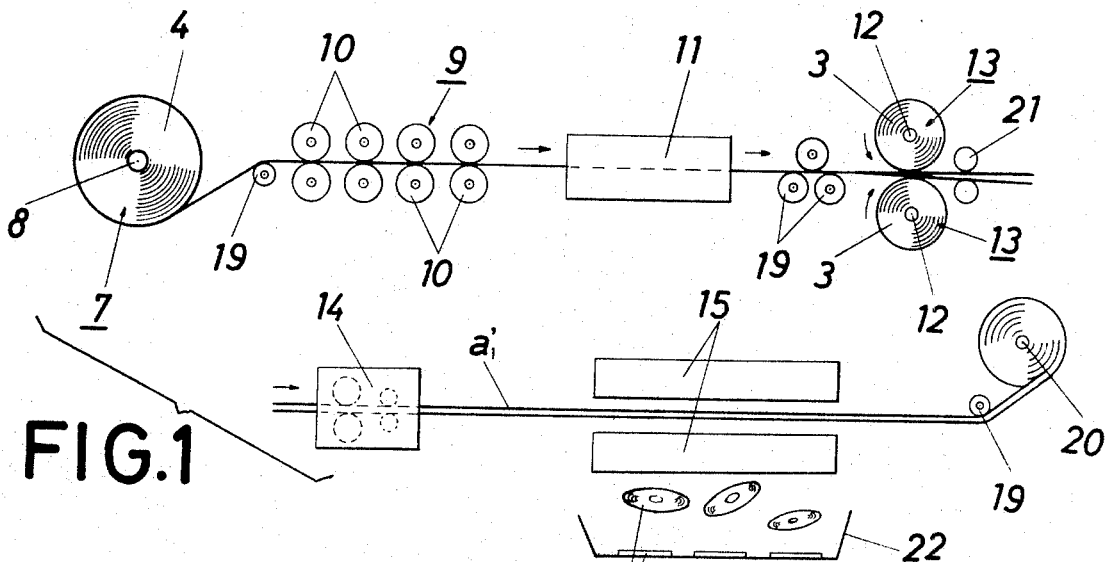
FIG. 1 is a diagram of the embodiment of the invention for continuously producing the finished products.
Figure 2:
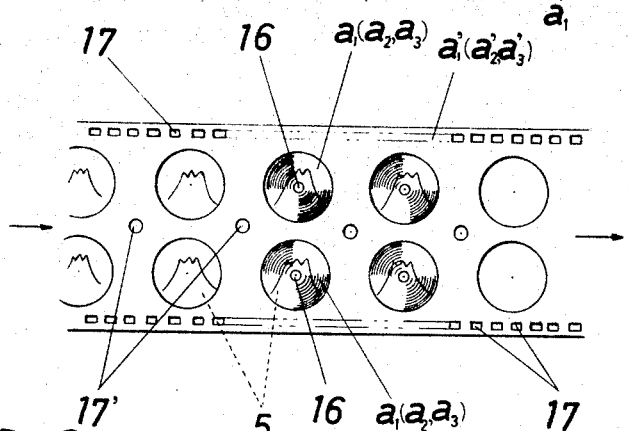
FIG. 2 is a plan showing a main part of the plastic sheet material in the finally forming process by a punching and striking and pressing means to form four sheets of record discs at a time.

In FIG. 1, the numeral 19 refers to a guide roller, 20 is a spool for receiving the wasted sheet material, 21 is a press roll and 22 is a cradle for accepting products.

Although the method of manufacturing sheet records has been explained in various embodiments as shown in FIGS. 3A, 3B and 3C, the method of the present invention is not limited within the scope as described above, but includes the process in which printing, laminating and press and forming steps should be continuously carried out so that printed marks may be seen through the laminated transparent plastic sheets or sheet thereon. The printing or laminating treatment can be employed by conventional methods.

Instead of the perforation formed on the edges of the film-like material for the purpose of making the printed figures to be coincidental with the perforation, electrical inspection by means of a photo tube or mechanical regulation by means of concavo-convexes or linear projections formed on the material can be adapted.

The method of continuously manufacturing a plurality of sheet records in a process has been described herein above for purpose of illustration and are not intended to define limits of the present invention, the scope of which is defined by the following claims.

What is claimed is:

1. A method of continuously manufacturing a plurality of sheet records comprising the steps of advancing a first web of sheet material in a predetermined path; printing at least one surface of said web with a plurality of visual representations spaced longitudinally of said web; laminating to at least said one surface a second web of plastic sheet material, at least one of said webs being light-transmissive so that said visual representations are visible therethrough, so as to obtain a laminated web; and impressing a set of sound grooves into at least one surface of said laminated web over each of the respective visual representations, and simultaneously punching from said laminated web respective disc-shaped portions each of which carries at least one of said visual representations and an associated set of sound grooves.

2. A method as defined in claim 1, said first web being provided with perforations along its longitudinal edges, and wherein the step of advancing comprises the steps of engaging said perforations and pulling said first web along said path.

3. A method as defined in claim 1, wherein the step of laminating comprises providing adhesion between at least two webs of material so as to form a laminate, said laminate including at least one web of transparent material and at least one additional web of a material selected from the group consisting of opaque material, metallic foil, and opaque synthetic resin.

4. A method as defined in claim 1, further comprising the step of drying after said printing step.

5. A method as defined in claim 4, wherein the step of printing comprises the steps of color printing intermediate relief and intaglio printing.

6. A method as defined in claim 1, wherein said sound grooves are only impressed on one surface of said laminated web.

7. A method as defined in claim 1, wherein the step of printing comprises the step of printing the mirror images on the back side of said first sheet material in the form of negative representations so that the latter can be seen positively from the front side of said first sheet material.

8. A method as defined in claim 1, wherein said first sheet material is formed with projections, and said step of advancing comprises the steps of engaging said projections and pulling said first web along the path.

References Cited

UNITED STATES PATENTS

| 2,528,611 | 11/1950 | Saffady | 156—219 |
| 3,050,433 | 8/1962 | Sakamoto | 156—219 |
| 3,072,519 | 1/1963 | Salzman | 156—253 X |

FOREIGN PATENTS

| 326,765 | 3/1930 | Great Britain | 274—42 P |

RICHARD D. LOVERING, Primary Examiner

U.S. Cl. X.R.

156—253, 277, 384; 274—41 A, 42 P